(No Model.)
C. J. GRELLNER.
HAMMER.
No. 282,308. Patented July 31, 1883.
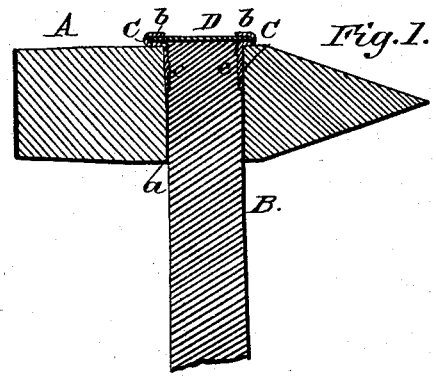
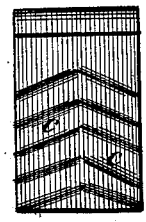
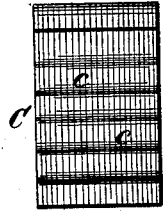
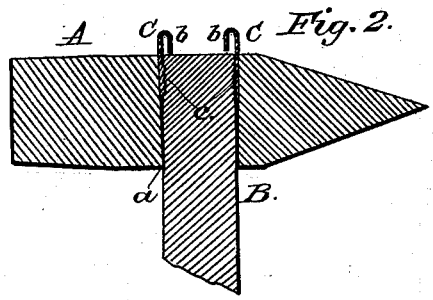
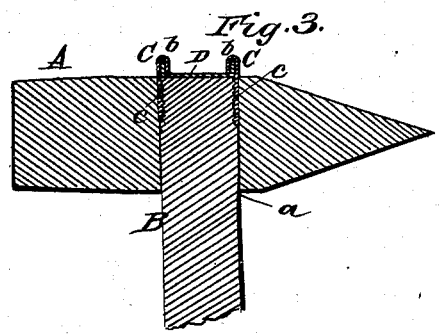
WITNESSES:
Fred. G. Dieterich.
Arthur L. Morsell.
Christopher J. Grellner,
INVENTOR.
By Louis Bagger & Co.
ATTORNEYS.
N. PETERS, Photo-Lithographer, Washington, D. C.

UNITED STATES PATENT OFFICE.

CHRISTOPHER J. GRELLNER, OF ST. LOUIS, MISSOURI.

HAMMER.

SPECIFICATION forming part of Letters Patent No. 282,308, dated July 31, 1883.

Application filed April 9, 1883. (No model.)

*To all whom it may concern:*

Be it known that I, CHRISTOPHER J. GRELLNER, of St. Louis, State of Missouri, have invented certain new and useful Improvements in Hammers; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical section of a hammer-head and the upper part of its handle provided with my improvement. Fig. 2 is a similar view of the hammer-head and its handle, with side plates, prior to the insertion of the top plate. Fig. 3 shows the same construction, but with a modification in the construction of the top plate; and Figs. 4, 5, 6, and 7 are detail views representing different modifications in the construction of the serrated holding-plates.

Similar letters of reference indicate corresponding parts in all the figures.

My invention has relation to devices for fastening or attaching the heads of hammers, hatchets, axes, or mallets to their handles; and it consists in the combination, with the head and its handle, of a pair of holding-plates, which are inserted with the handle into the eye of the hammer, and operate in conjunction with a plate crossing the top of the handle above the eye, substantially as hereinafter more fully described and claimed.

In the accompanying drawings, A represents the hammer-head, of any desired construction and shape. *a* is the eye, and B is the top part of the handle, which is inserted into the eye. On opposite sides of the handle I place plates C C, which are doubled at their upper ends to form projecting beads or flanges *b b*. Each of these plates is provided on the side facing the handle with projecting teeth or serrations *c*, which may either be of "herring-bone" pattern, as shown in Fig. 4; or they may consist of a series of parallel ribs or corrugations, as shown in Fig. 5; or they may be formed by striking up the plate to form a series of small holes or apertures having ragged edges, as in Fig. 6; or the plate may be constructed to form a series of regular or irregular figures, as shown in Fig. 7. In other words, I do not confine myself to any particular form or shape of the teeth or projections formed on the side of the plates facing the handle, nor to the means of producing the same, so that they will operate to bite into the wood of the hammer-handle when this is inserted into the eye of the hammer-head.

By the forcing of the handle, with its holding-plates, into the eye *a*, the teeth or projections on the plates C C are forced into the wood of that part of the handle which projects into the eye of the hammer-head, thereby holding them firmly in place and forming wedges on both sides of the handle, which, by binding firmly against the eye, will prevent the head from coming off. After the handle has been placed in position within the eye, the projecting double parts or flanges *b b* of the plates are bent sidewise in opposite directions, to permit of the insertion of the top plate, D, which is held in place by pressing or hammering down said flanges *b b*, as shown in Fig. 1 of the drawings. Thus it will be seen that the top plate, D, operates not only as an auxiliary in conjunction with the serrated side plates, C C, to hold the head firmly in its position upon the handle, but it also acts as a brace for the plates C C, to prevent their lapped-over portion from straightening out, which will be apt to occur where these side plates are made of thin metal. If desired, this top plate, D, may be made of any desired ornamental design to add to the beauty or attractiveness of the tool as a whole, as in the case of tack-hammers or hammers for household or amateur use. In some cases, where the serrated side plates, C C, are made of sufficient stiffness, the top plate, D, may be dispensed with, if desired.

Having thus described my invention, I claim and desire to secure by Letters Patent of the United States—

1. In a hammer, hatchet, or similar implement, the combination, with the head A, having eye *a*, and the handle B, of the serrated side plates, C C, having doubled top flanges, *b,* and the cap-plate D, inserted into said flanges, substantially as and for the purpose set forth.

2. The holding-plates C, serrated to form teeth or projections $c$ on the side facing the handle, and provided with the doubled bead or flange $b$ at the top edge, substantially as and for the purpose shown and set forth.

In testimony that I claim the foregoing as my own I have hereunto affixed my signature in presence of two witnesses.

CHRISTOPHER JOS. GRELLNER.

Witnesses:
   H. W. ROBERTS,
   J. A. CARROLL.